(12) United States Patent
Silverman et al.

(10) Patent No.: US 12,299,614 B2
(45) Date of Patent: May 13, 2025

(54) SYSTEM AND METHOD FOR CALIBRATING A WFM SCHEDULING MODULE

(71) Applicant: Verint Americas Inc., Alpharetta, GA (US)

(72) Inventors: Jonathan M. Silverman, Palo Alto, CA (US); Edward O. Hamilton, Mount Hamilton, CA (US); Nicholas Mortimer, Sheffield (GB)

(73) Assignee: Verint Americas Inc., Alpharetta, GA (US)

( * ) Notice: Subject to any disclaimer, the term of this patent is extended or adjusted under 35 U.S.C. 154(b) by 0 days.

(21) Appl. No.: 18/321,154

(22) Filed: May 22, 2023

(65) Prior Publication Data

US 2023/0289679 A1 Sep. 14, 2023

Related U.S. Application Data

(62) Division of application No. 17/665,552, filed on Feb. 6, 2022.

(Continued)

(51) Int. Cl.
*G06Q 10/0631* (2023.01)
*G06Q 10/1093* (2023.01)

(52) U.S. Cl.
CPC ... *G06Q 10/06312* (2013.01); *G06Q 10/1097* (2013.01)

(58) Field of Classification Search
None
See application file for complete search history.

(56) References Cited

U.S. PATENT DOCUMENTS 8,078,486 B1 * 12/2011 McLean ......... G06Q 10/063114
  705/7.14
8,170,841 B2 * 5/2012 Pinto ............... G06Q 40/03
  703/2

(Continued)

FOREIGN PATENT DOCUMENTS

CA  2564003 A1  4/2007

OTHER PUBLICATIONS

Chulani, Sunita, Barry Boehm, and Bert Steece. "Bayesian analysis of empirical software engineering cost models." IEEE Transactions on Software Engineering 25.4 (1999): 573-583 (Year: 1999).*

(Continued)

*Primary Examiner* — Darlene Garcia-Guerra
(74) *Attorney, Agent, or Firm* — Meunier Carlin & Curfman LLC (57) ABSTRACT

System and method for calibration of WFM system modeling parameters. A first mode M[D,S] of a modeler computes demand-shrinkage controlled service levels and an error metric e(M[D,S]) between the controlled and actual service levels. A user device iteratively adjusts each core parameter. When the user is satisfied that e(M[D,S]) is sufficiently small, calibration of the core parameters is complete. The same is done for calibrating the modeling factor, and then a final e(M[D,S])$_f$ is computed. A second mode M[D] computes, using the parameters just calibrated, demand-controlled service levels and an error metric e(M[D]) between the controlled service levels and actual levels. The user iteratively adjusts the shrinkage. When the user is satisfied that e(M[D]) is sufficiently small, calibration of the core parameters is complete.

12 Claims, 4 Drawing Sheets

Related U.S. Application Data (60) Provisional application No. 63/146,617, filed on Feb. 6, 2021.

(56) References Cited

U.S. PATENT DOCUMENTS

| | | | | |
|---|---|---|---|---|
| 11,233,905 | B1* | 1/2022 | Lombard | H04M 3/523 |
| 11,315,050 | B2 | 4/2022 | Martin et al. | |
| 2005/0013428 | A1 | 1/2005 | Walters | |
| 2005/0240465 | A1 | 10/2005 | Kiran et al. | |
| 2007/0198329 | A1 | 8/2007 | Lyerly et al. | |
| 2007/0198330 | A1* | 8/2007 | Korenblit | G06Q 10/06398 |
| | | | | 705/7.42 |
| 2007/0220517 | A1* | 9/2007 | Lippett | G06F 9/5038 |
| | | | | 718/102 |
| 2008/0172286 | A1 | 7/2008 | Ramanujan et al. | |
| 2011/0010219 | A1 | 1/2011 | Stearns et al. | |
| 2011/0066887 | A1 | 3/2011 | Bassin et al. | |
| 2011/0119604 | A1* | 5/2011 | Lo | G06Q 10/06 |
| | | | | 715/762 |
| 2013/0110271 | A1* | 5/2013 | Fornell | G06F 30/00 |
| | | | | 700/103 |
| 2014/0324499 | A1* | 10/2014 | Placiakis | G06Q 10/063116 |
| | | | | 705/7.16 |
| 2015/0092936 | A1 | 4/2015 | Riefel | |
| 2015/0235143 | A1* | 8/2015 | Eder | G16Z 99/00 |
| | | | | 706/12 |
| 2016/0217401 | A1 | 7/2016 | Leung et al. | |
| 2016/0291584 | A1* | 10/2016 | Horn | G05B 19/41865 |
| 2020/0090063 | A1* | 3/2020 | Reynolds | G06Q 10/0637 |
| 2022/0027744 | A1* | 1/2022 | Krishnan | G06Q 10/06315 |

OTHER PUBLICATIONS

Malawski, Maciej, et al. "Scheduling multilevel deadline-constrained scientific workflows on clouds based on cost optimization." Scientific Programming 2015 (2015): 5-5 (Year: 2015).*

Raftery, Paul, Marcus Keane, and James O'Donnell. "Calibrating whole building energy models: An evidence-based methodology." Energy and Buildings 43.9 (2011): 2356-2364 (Year: 2011).*

Leung, Stephen CH, et al. "A robust optimization model for multi-site production planning problem in an uncertain environment." European journal of operational research 181.1 (2007): 224-238 (Year: 2007).*

Extended Search Report, dated Jun. 28, 2022, received in connection with EP Patent Application No. 22155457.9.

Sadjadi, S. J., et al. "A new nonlinear stochastic staff scheduling model." Scientia Iranica 18.3 (2011): 699-710 (Year: 2011).

Non-Final Office Action issued in U.S. Appl. No. 17/665,552, dated Sep. 9, 2023.

Seada, Aya Abdelrahman, and Amr B. Eltawil. "Modeling and analysis of workforce management decisions in modern call centers." 2015 International Conference on Industrial Engineering and Operations Management (IEOM). IEEE, 2015.

Office Action issued for U.S. Appl. No. 17/665,552, dated Apr. 5, 2024.

Office Action issued in U.S. Appl. No. 17/665,552 on Nov. 19, 2024.

Pereira, Dilson Lucas, Julio Cesar Alves, and Mayron Cesar de Oliveira Moreira. "A multiperiod workforce scheduling and routing problem with dependent tasks." Computers & Operations Research 118 (2020): 104930 (Year: 2020).

* cited by examiner

SYSTEM AND METHOD FOR CALIBRATING A WFM SCHEDULING MODULE

RELATED APPLICATIONS

This application is a division of U.S. patent application Ser. No. 17/665,552, filed Feb. 6, 2022, and claims the benefit of priority to U.S. provisional application 63/146,617, filed on Feb. 6, 2021, the disclosure of each application is incorporated by reference herein in its entirety.

U.S. Pat. No. 7,155,399 B2, "System and method for complex schedule generation," to Andre, et al., is incorporated by reference herein in its entirety.

FIELD OF THE INVENTION

The disclosure is in the field of workforce management systems, and in particular relates to a system and method for calibration of a WFM scheduling model.

BACKGROUND TO THE INVENTION

Contact centers rely on workforce management (WFM) applications to develop detailed weekly schedules for their employees. WFM leverages advanced scheduling algorithms to generate optimal schedules that achieve target service goals based on a model of the customer's operations and work rules and forecasted call volumes and average handle times in future weeks.

SUMMARY

In an aspect of the disclosure there is a method of calibrating a scheduling model parameters of a workforce management (WFM) scheduling model, wherein the scheduling model parameters comprises user-set calibration parameters and a shrinkage, the method comprising: adjusting the user-set calibration parameters and the shrinkage, wherein the user-set calibration parameters comprise core parameters and modeling factors; calculating for each adjustment of each of the user-set calibration parameters, a first service level error metric, wherein the computing inputs are actual demands and an actual schedule from a previous period and a shrinkage of zero to produce a calibrated user-set calibration parameters. Further, calculating for each adjustment of shrinkage, a second service level error metric, wherein the computing inputs are actual demands, and the calibrated user-set calibration parameters to produce a calibrated shrinkage; updating a WFM database of the WFM system with a difference between the final first service level error and the third service level error metric, the calibrated user-set calibration parameters and the calibrated shrinkage. Wherein the user-set calibration parameters are calibrated such that the core parameters are calibrated before the modeling factor.

In another aspect there is a method for updating a calibration health indicator comprising: receiving, by a processor, predicted service levels and actual service levels from a workforce management system database; calculating, by the processor, a scheduling error metric e(M) between the predicted service levels and the actual service levels; and displaying, by the processor, on a calibration health indicator the difference between the scheduling error metric and a predetermined scheduling model error tolerance.

In a further aspect, there is a method for calibrating scheduling model parameters of a work force management (WFM) scheduling model, comprising obtaining, by a modeler in a schedule analyzer of the WFM system, modeling data for a previous period comprising: forecasted demands; a published schedule; predicted service levels; actual demands; an actual schedule; actual service levels; and scheduling model parameters comprising a shrinkage and user-set calibration parameters, wherein user-set calibration parameters comprise core parameters and a modeling factor.

Then executing the following calibration:

instructing, by a calibration director and interface (CDI) of the WFM system, a statistics predictor and the modeler in a demand-shrinkage controlled mode, to compute, a first calibration-error metric e(M[D,S]) as a function of the actual demands, the actual schedule, the shrinkage set to zero, the core parameters, and the actual service levels, wherein the statistics predictor, and the modeler are comprised in the schedule analyzer;

receiving, by the CDI, the first calibration-error metric e(M[D,S]); displaying, by the CDI, the first calibration-error metric on an input/output device (I/O device) of the WFM system;

repeating the following process separately for each of user-set calibration parameters, until the CDI receives an input from the I/O device to stop adjusting for the user-set calibration parameters, wherein the input to stop is based on achieved calibration of the user-set calibration parameters to produce calibrated user-set calibration parameters; (i) receiving, by the CDI from the I/O device, an adjustment to each of the user-set calibration parameters value; (ii) transmitting, by the CDI to the modeler, the adjustment to each of the user-set calibration parameters value; (iii) instructing, by the CDI, the modeler to compute a new first calibration-error metric e(M[D,S]), substituting adjustment value for those used in the computation of the first calibration-error metric; (iv) receiving, by the CDI from the modeler, the new first calibration-error metric; and (v) displaying, by the CDI to the I/O device, the new first calibration-error metric;

instructing, by the CDI, the statistics predictor, and the modeler in a demand controlled mode, to compute, a second calibration-error metric as a function of the actual demand, the published schedule, the shrinkage, the calibrated core parameters, the calibrated modeling factor and the actual service levels;

receiving, by the CDI, the second calibration-error metric e(M[D]); displaying, by the CDI, a calibration-error metric difference e(M[D,S])−e(M[D]) on the I/O device;

receiving, by the CDI from the I/O device, an adjustment to shrinkage; transmitting, by the CDI, to the modeler the adjustment to shrinkage and the calibrated core parameter and the calibrated modeling factor;

repeating the following, until the CDI receives an input from the I/O device to stop adjusting, wherein the input to stop is based on calibration shrinkage is achieved to produce a calibrated shrinkage; (i) receiving, by the CDI from the I/O device, an adjustment to the shrinkage; (ii) transmitting, by the CDI to the modeler, the adjustment to the shrinkage; (iii) instructing, by the CDI the modeler to compute a new second calibration-error metric e(M[D]), substituting the adjustment to the shrinkage for those used in the computation of the second calibration-error metric; (iv) receiving, by the CDI from the modeler, the new second calibration-error metric; and (v) displaying, by the CDI to the I/O device, the new second calibration-error metric; and updating a WFM database of the WFM system with the calibrated core parameters, the calibrated modeling factor, and the calibrated shrinkage, replacing the same from the previous period.

In an aspect the method wherein, the user-set calibration parameters are calibrated such that the core parameters are calibrated before the modeling factor, an I/O device instructs the WFM system to start calibrate scheduling model parameters, and the CDI stores in the WFM database, the modeling data calibrated by the method as historical calibrated modeling data, and the first and second calibration-error metrics computed last that achieved calibration.

The method further comprising: receiving, by the CDI, the predicted service levels and the actual service levels; calculating, by the CDI, the scheduling error metric e(M); and displaying, by the CDI on the I/O device, a calibration health indicator configured to indicate the difference between the scheduling error metric and a predetermined scheduling model error tolerance. Also, the method further comprising: instructing, by the CDI, the schedule optimizer, the statistics predictor and the modeler, in a shrinkage controlled mode, to compute, a third calibration-error metric e(M[S]) as a function of the forecasted demand, the actual schedule, a shrinkage set to zero, the calibrated core parameters, the calibrated modeling factor, and the actual service levels; performing, by the CDI, one of the following: saving the third calibration-error metric in the WFM database, alerting an I/O device of a user of the WFM system, or any combination thereof.

A system for calibrating modeling data of a work force management (WFM) system, comprising a memory comprising instructions that when executed on a processor cause the system to perform the method of this disclosure. Such as, receive, by a modeler in a schedule analyzer of the WFM system, modeling data for a previous period comprising: forecasted demands; a published schedule; predicted service levels; actual demands; an actual schedule; actual service levels; and scheduling model parameters comprising a shrinkage and user-set calibration parameters, wherein user-set calibration parameters comprise core parameters and a modeling factor.

Then execute the following calibration:
  instruct, by a calibration director and interface (CDI) of the WFM system, a statistics predictor and the modeler in a demand-shrinkage controlled mode, to compute, a first calibration-error metric e(M[D,S]) as a function of the actual demands, the actual schedule, the shrinkage set to zero, the core parameters, and the actual service levels, wherein the statistics predictor, and the modeler are comprised in the schedule analyzer;
  receive, by the CDI, the first calibration-error metric e(M[D,S]); display, by the CDI, the first calibration-error metric on an input/output device (I/O device) of the WFM system;
  repeat the following process separately for each of user-set calibration parameters, until the CDI receives an input from the I/O device to stop adjusting for the user-set calibration parameters, wherein the input to stop is based on achieved calibration of the user-set calibration parameters to produce calibrated user-set calibration parameters; (i) receive, by the CDI from the I/O device, an adjustment to each of the user-set calibration parameters value; (ii) transmit, by the CDI to the modeler, the adjustment to each of the user-set calibration parameters value; (iii) instruct, by the CDI, the modeler to compute a new first calibration-error metric e(M[D,S]), substituting adjustment value for those used in the computation of the first calibration-error metric; (iv) receive, by the CDI from the modeler, the new first calibration-error metric; and (v) display, by the CDI to the I/O device, the new first calibration-error metric; instruct, by the CDI, the statistics predictor, and the modeler in a demand controlled mode, to compute, a second calibration-error metric as a function of the actual demand, the published schedule, the shrinkage, the calibrated core parameters, the calibrated modeling factor and the actual service levels;
  receive, by the CDI, the second calibration-error metric e(M[D]);
  display, by the CDI, a calibration-error metric difference e(M[D,S])−e(M[D]) on the I/O device; receive, by the CDI from the I/O device, an adjustment to shrinkage; transmit, by the CDI, to the modeler the adjustment to shrinkage and the calibrated core parameter and the calibrated modeling factor;
  repeat the following, until the CDI receives an input from the I/O device to stop adjusting, wherein the input to stop is based on calibration shrinkage is achieved to produce a calibrated shrinkage; (i) receive, by the CDI from the I/O device, an adjustment to the shrinkage; (ii) transmit, by the CDI to the modeler, the adjustment to the shrinkage; (iii) instruct, by the CDI the modeler to compute a new second calibration-error metric e(M[D]), substituting the adjustment to the shrinkage for those used in the computation of the second calibration-error metric; (iv) receive, by the CDI from the modeler, the new second calibration-error metric; and (v) display, by the CDI to the I/O device, the new second calibration-error metric; and updating a WFM database of the WFM system with the calibrated core parameters, the calibrated modeling factor, and the calibrated shrinkage, replacing the same from the previous period.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to a system and method for calibrating scheduling model parameters of a contact center WFM application. Many companies such as contact centers rely on WFM scheduling applications to generate employee schedules. WFM scheduling algorithms search through possible candidate schedules to find a candidate schedules that minimize the expected error between service level goals and predicted service levels. The ability for the scheduling engine to accurately predict service levels is therefore a key prerequisite for ensuring schedule quality. Scheduling relies on a detailed scheduling model which includes many input parameters representing the contact center environment and parameters that characterize behaviors of customers and agents of the call center. The scheduling model may fall out of calibration and need to be calibrated. Sometimes it is not obvious to call center personnel that the scheduling model is out of calibration and even if it is noticed, call center personnel often do not know the cause. The scheduling model is considered calibrated if it can predict service levels accurately on a consistent basis. In some embodiments of the current disclosure, there is a guided guides the calibration of the scheduling models comprising searching for better parameters for the scheduling model, thus producing a better model, which produces a better schedule to meet service goals.

A contact center agent is an employee of the contact center, hereinafter agent, handles contacts with customers in each contact queue. A user is a contact center personnel who handles the contact center system.

In some embodiments, at the end of a scheduling period, predicted and actual demands, a published and actual schedule, and predicted and actual service levels are received. In some embodiments, actual data is used for control purposes during calibration. A first mode M[D,S] of system initiates a computation of demand-shrinkage controlled service levels and an error metric e(M[D,S]) between the controlled and actual service levels for calibration of the core parameters. The same is done for calibrating the modeling factor, and then a final $e(M[D,S])_f$ is computed. A second mode M[D] of the modeler computes, using the parameters just calibrated in the first mode, initiates a computation of demand controlled service levels and an error metric e(M[D]) between the controlled service levels and actual levels for calibration of shrinkage. The calibrated core parameters, modeling factor, and shrinkage are saved to a database for use in scheduling an upcoming period by a scheduling mode M of the modeler, where they are available to a scheduling mode of the modeler to produce a schedule for a next period. This method will be explained in detail below.

Figure 1:
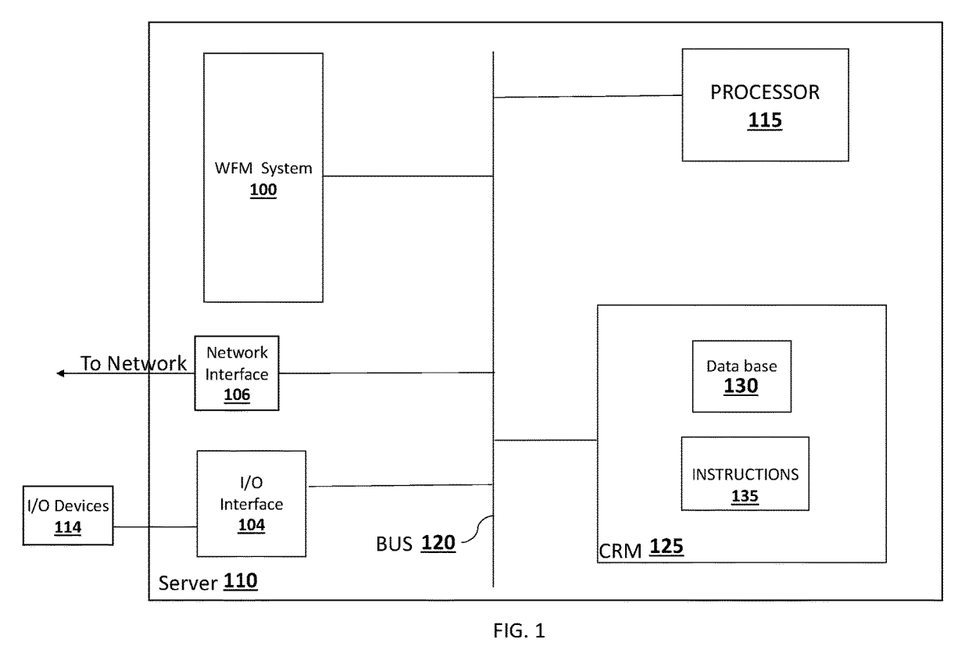
FIG. 1 depicts a block diagram of an organization's server including a workforce management (WFM) system, according to some embodiments.

Reference is now made to FIG. 1, depicting a block diagram of an organization's server 110 including a workforce management (WFM) system 100, according to some embodiments.

The organization server 110 comprising a WFM system 100 and a processor 115 and may be hosted on a single computer or server. Alternatively, the features and functions of the organization server 110, as described herein, may be distributed over a plurality of networked computers, which may consist of or include computers serving distributed computing system such as a cloud platform. In this disclosure, processor 115 (in the singular) is understood to mean one or more processors physical or virtual of the organization server 110, whether the organization server 110 is hosted on a single computer or whether the features and functions of the organization server 110 are distributed over a distributed computing system. According to certain embodiments, server 110 may be a virtual or containerized environment instantiated on one or more computing systems or distributed computing systems.

The processor 115 is in connection, via at least one bus 120, to one or more non-transitory computer-readable media (CRMs) 125. The CRMs 125 may comprise any combination of non-volatile memory, and storage devices. In some embodiments, the CRMs 125 store one or more databases 130. The databases 130 may be communicatively connected, through the processor(s), with one or more external databases (not shown) via the network interface 106 for the network or the bus 120. The processor 115 may receive and execute programing instructions 135 stored in the CRM 125. Similarly, the processor 115 may retrieve and store application data residing in the CRM 125.

The system may further comprise one or more I/O device interfaces 104 that may allow for the connection of various I/O devices 114 (keyboards, displays, mouse devices, pen input, etc.) to the server 110, and network interface 106 through which server 110 is connected to a network. The bus 120 may transmit programming instructions and application data, among the processor 115, I/O device interface 104, network interface 106, WFM system 100 and CRM 125. The WFM system 100 of a contact center is further described herein.

Figure 2:
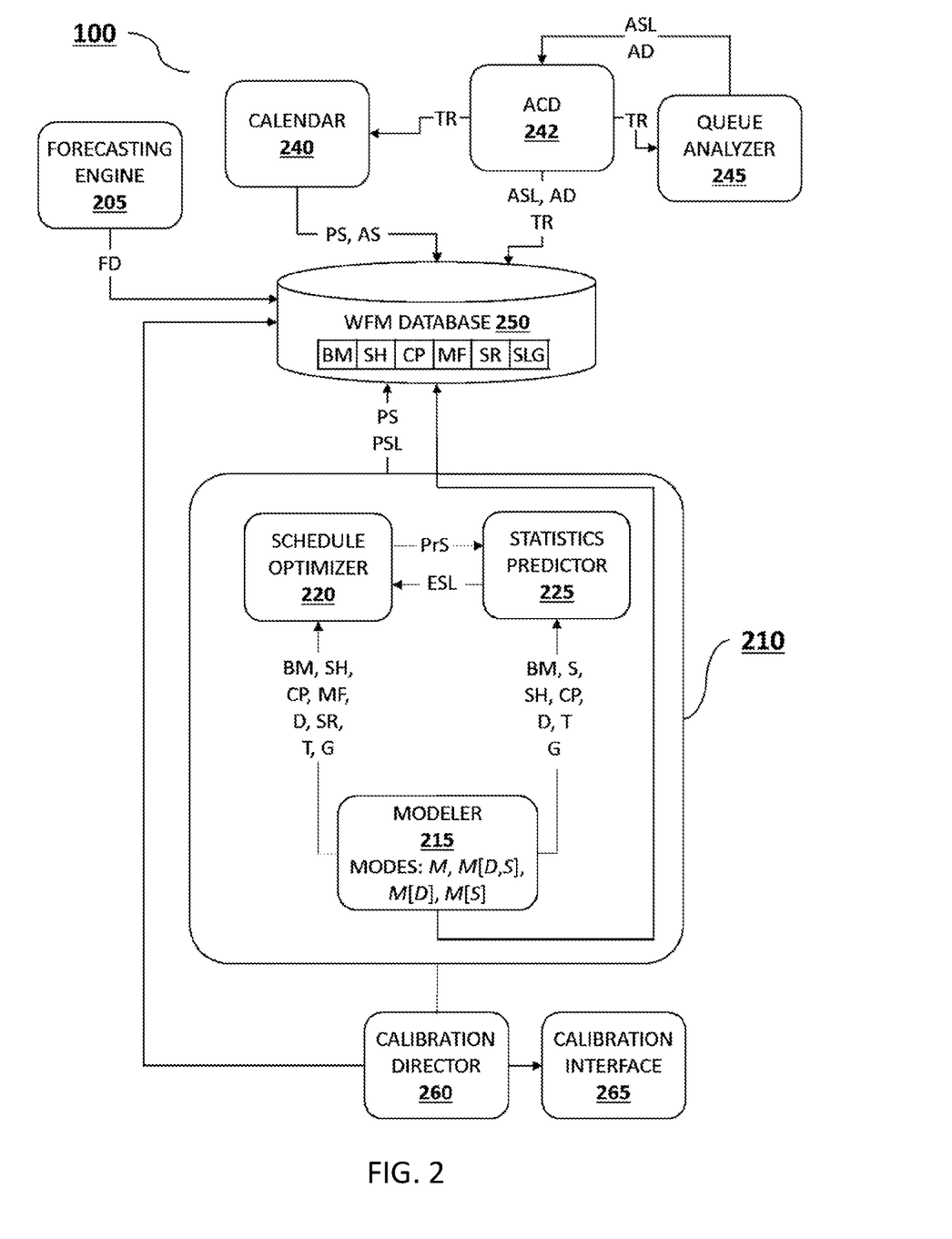
FIG. 2 depicts a functional block diagram of a workforce management (WFM) system of, according to some embodiments.

Reference is now made FIG. 2, depicting a functional block diagram of a workforce management (WFM) system 100, according to some embodiments.

In some embodiments, the WFM system comprises one or more of the following modules: a forecasting engine 205, a calendar 240, a queue analyzer 245, a WFM database 250, a schedule analyzer 210, and a calibration director and interface (CDI) 260.

In some embodiments, the WFM database receives modeling data from the forecasting engine 205, the calendar 240 and the queue analyzer 245. As used herein, modeling data is any set of data and/or parameters that may be used to accomplish calibration, and may contain for example core parameters and forecast demands. In some embodiments, the WFM database receives from an external automatic contact distributor (ACD), actual demands and actual service levels for each queue and time records for all employees of the contact center at the end of each week. ACD is typically part of a contact center server and not in the WFM. The WFM system typically contains a system adaptor component (note shown) to request and receive data from the ACD.

The forecasting engine 205 is configured to produce forecasted demands (FD) for queues of a contact center. Typical forecasted demands are forecasted contact volumes and average handling times (AHT).

After producing forecasted demands for an upcoming period, the forecasting engine 205 is typically configured to store the forecasted demands in the WFM database 250. The calendar 240 is typically configured to: view and edit schedules, send schedules to the schedule analyzer 210 for statistics predictions, receive optimal schedules back from the schedule analyzer and publish schedules (to set the official schedule for the contact center for a future week), save published schedules to the WFM database 250, receive a published schedule (published by the schedule analyzer 210) from the WFM database 250, receive the agent time records or time records (TR) from an the ACD 242, and construct an actual schedule (AS) based on the TR, and compare the published schedule to the actual schedule to report on agent adherence. The queue analyzer 245 typically is configured to provide various reporting views summarizing the queue statistics.

In some embodiments, the schedule analyzer 210 comprises a schedule optimizer 220, a statistics predictor 225, and a modeler 215. In some embodiments, the schedule optimizer 220 is configured to act both as a scheduling engine well known in the art, and a scheduling optimizer for use in scheduling model calibration as further described herein. When the schedule analyzer 210 is in scheduling mode, denoted algebraically as M, the scheduling optimizer 220 is configured to be a scheduling engine. In scheduling mode, the scheduling engine of the scheduling optimizer and the service level predictor 225 are operated in iterative cycles, with the schedule engine searching for and proposing schedule candidates until an expected service level of a proposed schedule is close to the service level goal (SLG). In some embodiments, when the service level goal or a best service level is achieved, the schedule analyzer 210 saves the expected service level as a current working schedule and a predicted service level (PSL) to the WFM database 250. In some embodiments, users may review and further modify this schedule and save their final schedule as the published schedule (PS).

Typically, the scheduling engine is configured to receive forecasted demand, a schedule from a user, a target (T) indicating an error metric to compute the goal, a goal (G), and schedule modeling parameters. The statistics predictor 225 may be configured to receive many of the modeling parameters and the forecasted demand from the modeler 215 to execute a statistical simulation to calculate the expected service level of the statistics predictor input schedule; and transmits the expected service levels and/or an error metric between the expected service levels and the service level goal to the scheduling engine. When in scheduling mode, the modeler 215 is configured to determine a schedule that meets a service level goal (SLG) and transmitting schedule modeling parameters and forecast demands to both the statistics predictor 225 and scheduling engine 210, such that both may operate in iterative cycles as described above.

The schedule modeling parameters may include a base model (BM), the SLG, shrinkage (SH), scheduling rules (SR), and user-set calibration parameters. As known in the art: shrinkage is a scaling factor to account for an agents-hours anticipated to be lost from a published schedule such as absences and unscheduled breaks; base model (BM) contains parameters that represent the physical environment, are known and are expected to change infrequently, such as a list of agents, a list of queues of the call center, and a list of agent's skills; and scheduling rules (SR) are business rules set by the user such as the minimum and maximum hours each agent can work in each week. Typically, user-set calibration parameters comprise: core parameters (CP) that are set by users to represent assumptions of predicted behaviors of the contact center, such as customer patience (expected time until customers abandon an unanswered call), agent proficiencies and agent skill priorities; and a modeling factor (MF) which is a scaling factor accounting for influences to service levels that are unknown by the user and are not forecasted by the WFM system 100.

Calibration of WFM System Modeling Parameters

In some embodiments, the CDI 260 receives at least one of the following modeling data, for a previous period, from the WFM database 250: the forecast demands, the published schedule, the predicted service levels, the scheduling model parameters, the actual demands, the actual schedule, and the actual service levels.

In some embodiments, the CDI 260, after receiving the modeling data for a specific previous period, instructs the modeler 215 and then the modeler 215 instructs the statistics predictor 225 to calculate the scheduling model error metric between the actual service levels and the predicted service levels. In some embodiments, The CDI 260 controls a calibration health indicator displayed on an I/O device 114 of the system server. If the model error metric is within a predetermined scheduling model error tolerance, the CDI 260 instructs the calibration health indicator to indicate that the calibration is in good health. If the scheduling model error metric is above the scheduling model error tolerance, the CDI 260 instructs the calibration health indicator to indicate that the calibration is in poor health. The CDI 260 may instruct the calibration health indicator to give intermediate indications (e.g., warnings based on color) if the scheduling error metric is near the scheduling model error tolerance or based on the error size if it is over tolerance. The calibration health indicator may appear on the same output device as a published schedule. The calibration health indicator may be displayed together with the agent schedules.

In some embodiments, the CDI 260 receives an input from a user to begin a calibration. The calibrating user would typically give the input to begin a calibration when the user sees that the calibration health indicator shows poor calibration health. However, in some embodiments an input to begin calibration can be at any time and/or under any condition of the calibration health. According to certain embodiments, calibration may begin based at least in part on a warning or error regarding calibration health, based on model error metric data from the modeler 215.

In some embodiments, upon receiving the input to begin a calibration, the CDI instructs the modeler 215 to compute several calibration error metrics. In some embodiments, the modeler of the schedule analyzer 210 is configured to have four modes: scheduling mode, demand-shrinkage controlled mode of calibration, shrinkage controlled mode of calibration, and demand controlled mode of calibration. In some embodiments, the modeler of the schedule analyzer 210 is configured to have four modes, the scheduling mode as discussed above and three calibration modes: demand-shrinkage controlled mode, shrinkage controlled mode, and demand controlled mode. Each calibration error metric is computed in one of the calibration modes of the modeler 215, as explained below. To facilitate understanding a calibration procedure is described for only one set of model parameters used over one period of time and for a single queue. However, it is understood that model parameters may vary during the course of a period and/or for different queues. Therefore, the calibration procedure may entail calibration of multiple sets of model parameters, for different times during the period and/or for different queues.

In some embodiments, the demand-shrinkage controlled mode which is algebraically denoted M[D,S], is executed. The modeler 215 transmits the actual demands and the actual schedule as inputs to the statistics predictor 225. The modeler 215 may instruct the statistics predictor 225 to calculate a first calibration error metric $e(M[D,S])$ between the first calibration-predicted service levels and actual service levels. In some embodiments, the modeler transmits a shrinkage of zero to the statistics predictor 225. The shrinkage set at zero is because the modeler 215 is transmitting already "shrunk" data, that is the actual schedule, which inherently has absences and other deviations from the published schedule already taken into account. The first calibration-predicted service level output from the statistics predictor is what predicted service level the statistics predictor 225 would have given for a published schedule, had it received from the scheduling model M the actual demand and actual shrinkage. Thus, all errors in the calibration-predicted service levels from the actual service levels are presumed to be due to the user-set parameters (the core parameters and the modeling factor) being out of calibration.

In some embodiments, in a demand controlled mode, denoted M[D], the modeler 215 transmits: the actual demands to the statistics predictor 225; the published schedule to the statistics predictor 225. The modeler 215 may instruct the statistics predictor 225 to calculate a second calibration-error metric e(M[D]) between second calibration-predicted service levels and actual service levels. The second-calibration-predicted service level output from the statistics predictor is a predicted service level the statistics predictor 225 would have given for the published schedule, had it received from the scheduling model M the actual demand Thus, all errors in the calibration-predicted service levels from the actual service levels are presumed to be due to the user-set parameters and the shrinkage being out of calibration.

In a shrinkage controlled mode, denoted M[S], the modeler 215 transmits: the forecasted demands to the statistics predictor 225; and the actual schedule to the schedule statistics predictor 225. The modeler 215 may instruct the statistics predictor 225 to calculate a third calibration-error metric e(M[S]) between third calibration-predicted service levels and actual service levels.

In some embodiments, the modeler transmits shrinkage as zero to the statistics predictor 225, because the actual schedule is already shrunk. The third calibration-predicted service level output from the statistics predictor is what predicted service level the schedule optimizer 220 would have given, had it received from the scheduling model M the actual shrinkage. Thus, all errors in the third calibration-predicted service levels from the actual service levels are presumed to be due to the user-set parameters being out of calibration and incorrect forecasted demands.

In some embodiments, the CDI 260 transmits the scheduling model error and calibration errors to I/O device for display thereon. The CDI 260 may also transmit for display the difference between the first and second calibration error metrics, e(M([D,S])−e(M[D]). The difference between the first and second calibrations is the error in predicting service level due to the shrinkage being out of calibration.

In some embodiments, the CDI 260 retrieves historical calibrations of previous weeks from the WFM database 250, and transmits the historical calibrations to the I/O device for display to the user. The historical calibrations comprise values of the calibration error metrics that were achieved after calibrating the shrinkage, user-set parameters and demands. The values may be average calibration error metrics of recent calibrations, which may be weighted by time (the more recent values weighted more heavily than earlier values). The historical calibrations can provide the user with benchmarks of how much error from each group of modeling data can be reduced by the calibrations.

In some embodiments, the CDI 260 may save the user-defined parameters (core parameters and modeling factor) and the shrinkage used to schedule the previous period.

Upon completion of calibration, the newly calibrated values may be saved to the WFM database 250, and made available for inputs to the schedule analyzer 210 for scheduling future periods.

In some embodiments, the CDI 260 displays a prompt in the I/O device for the user to calibrate the user-set parameters. If the user responds positively to the prompt, the CDI 250 then prompts the user to select a user-set parameter to calibrate, or may offer the user a particular user-set parameter (e.g., customer patience) to calibrate. The CDI then prompts the user to enter adjusted values for the selected (or offered) user-set parameter. Upon the user entering the adjusted values, the CDI 260 saves the adjusted user-set parameters and invokes the modeler 215 to compute the first calibration error metric of the demand-shrinkage controlled mode adjusted calibration model, e(M([D,S]), substituting the adjusted values for the user-set parameter for the values of same used in scheduling the previous period. The CDI 260 displays to the I/O device the calculated value of e(M([D,S]). The user thus, by trial-and-error, continues to adjust the user-set parameter until satisfactory improvement is achieved in reducing e(M([D,S]), thus having achieved a calibrated adjustment of the user-set parameter. The user is similarly prompted and makes adjustments to each of the user-set parameters.

In some embodiments, calibration of the core parameters happens before calibration of the modeling factor. Since the core parameters are based on the knowledge and intuition of contact center employees, the user will provide more accurate adjustments to the core parameters than to the modeling factor. After the core parameters are calibrated, modeling factor is the only uncalibrated user-set parameter. Moreover, since the modeler 215 is operating in the demand-shrinkage controlled mode, i.e., transmitting the actual demands and actual schedule to the statistics predictor 225, the uncalibrated modeling factor is the residual contributing source of error to the first calibration error metric.

In some embodiments, the CDI 260 displays a prompt to the user to calibrate the shrinkage. If the user responds positively, the user is then prompted to enter adjusted values for the shrinkage. Upon the user entering the adjusted values, the CDI 260 saves the adjusted shrinkage parameter and instructs the modeler 215 to compute the second calibration error metric of the demand mode adjusted calibration model, e(M([D]), with the adjusted shrinkage parameters. The CDI 260 displays the calculated value of e(M([D]). The user, by trial-and-error, continues to adjust the shrinkage until satisfactory improvement is achieved in the shrinkage, thus having achieved a calibrated value of the shrinkage.

Since the user-set parameters including the modeling factors had already been calibrated, the shrinkage calibration is made more accurately than possible under previous calibration methods, where no demand and shrinkage adjusted calibration model, e(M([D,S]), was used to isolate shrinkage from user-set parameters and shrinkage itself was calibrated together with the user-set parameters before calibrating the modeling factors. There was no differentiation, for example, between errors caused by modeling factor inaccuracies and errors caused by shrinkage inaccuracies This often would result in users skewing the shrinkage values to cover errors caused by modeling factor inaccuracies.

After calibration of the user-set parameters and shrinkage, the CDI 260 may save these newly calibrated user-set parameters to the WFM database 250, from which these newly calibrated user-set parameters may be retrieved by the schedule analyzer 210 to produce a schedule for future periods.

In some embodiments, the CDI 260 may instruct the modeler 215 to compute the third calibration-error error metric, e(M[S]), based on the newly calibrated user-set parameters and shrinkage. The CDI 260 may display to the I/O device the error e(M[D,S])−e(M[S]), the error presumed to be due to inaccurate forecasted demands. Since the core parameters, modeling factors and shrinkage have already been calibrated, and error caused by all of these parameters are known, any remaining error for M[S] can be attributed to the impact of the forecasted demands.

In some embodiments, the CDI 260 transmits an alert via I/O devices to users and to the forecasting engine 205 if the error due to the forecast demands causes model calibration error beyond some tolerance. This can trigger a requirement for retraining, reevaluation and reconfiguring of the forecasting algorithms in the forecasting module.

In some embodiments, after forecasting algorithms are updated, the user can rerun the updated forecasts for the current week and recalculate e(M[S]) to see if the updated forecasts satisfactorily reduce the model calibration error due to the demand forecasts.

Figure 3:
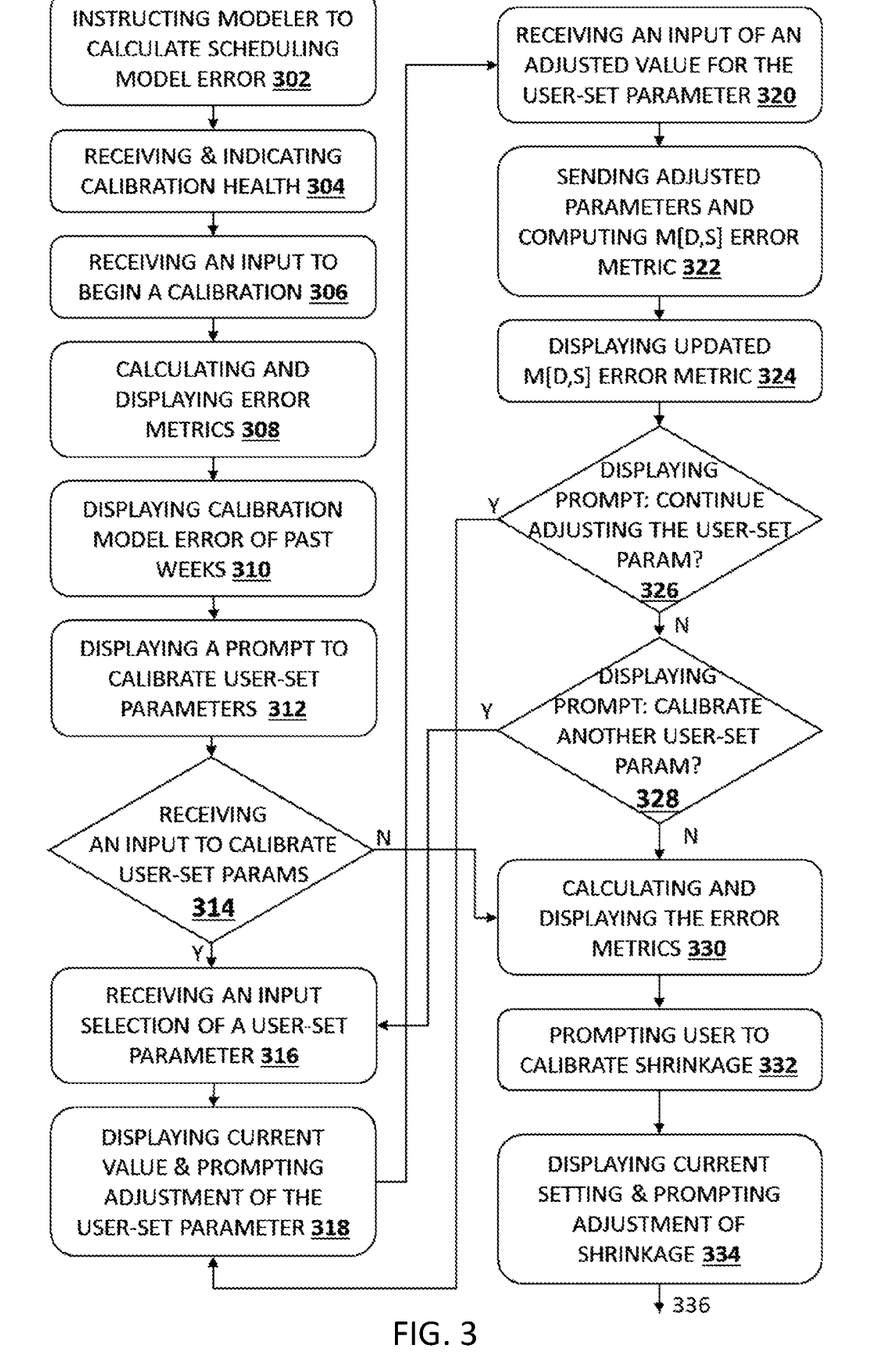
FIG. 3 depicts a flow chart of a method for calibrating WFM scheduling model parameters, according to some embodiments.

In some embodiments, the WFM system further comprise an auto parameter component (not shown) configured to optimize some or all of the user-set parameters for calibration. This components may optimize each parameter independently or a selected group of parameters together. In some embodiments, the WFM system further comprises an auto shrinkage optimization demand component (not shown) configured to optimize shrinkage and/or modeling factors for calibration Reference is now made to FIG. 3, depicting a flowchart of a method for calibrating WFM modeling data of a schedule, according to some embodiments.

In some embodiments, the method 300 comprises a CDI 260 of a WFM system transmitting, at block 302, an instruction to a modeler to receive, from a WFM database, the following modeling data for a past period: predicted demands (PD), actual demands (AD), published schedule (PS), actual schedule (AS), predicted service levels (PSL), and actual service levels (ASL); and calculate the scheduling error metric e(M), between ASL and PSL. In some embodiments, the CDI instructs automatically at periodic intervals, such as one week. Optionally, the period is adjustable by an administrative user. In some embodiments, the CDI is triggered to run automatically by an external event such as receiving from an external ACD data containing weekly summaries of actual demands, actual service levels and agent time records.

In some embodiments, the method 300 comprises the CDI receiving, at block 304, the scheduling error metric and the CDI indicating the health of the present calibration on a calibration health indicator of an I/O device. If the scheduling error metric is within a scheduling error metric tolerance, the CDI displays on an I/O device a calibration health indicator indicating that the calibration is in good health. If the scheduling error metric is above the tolerance, the CDI displays on an I/O device the calibration health indicator indicating that the calibration is in poor health. In some embodiments, the calibration health indicator indicates if the scheduling error metric is in other ranges based on their proximity above or below the scheduling error metric tolerance.

In some embodiments, the method 300 comprises the CDI receiving, at block 306, an input from a user to begin a calibration. Usually, the user will begin a calibration upon seeing the calibration health indicator is indicating that that the calibration is in poor health. However, in some embodiments the CDI may receive an input from an I/O device to begin a calibration at any time and/or under any condition of the calibration health. As a result of the input, the CDI receives an instruction to begin calibration.

In some embodiments, the method 300 comprises the CDI instructing, at block 308, the modeler to compute first through third calibration error metrics: e(M(D,S]), e(M[D]), and e(M[S]), and transmitting the scheduling error metric M and the calibration error metrics to the CDI and the CDI display the same to an I/O device. Optionally, the CDI calculates the difference e(M[D]−e(M[D,S]) which is the contribution to error due to an uncalibrated shrinkage, and the difference e(M[S])−e(M(D,S]) which is the contribution to error due to inaccurate demand forecasts and displaying to an I/O device the differences. As an example, the display may appear as follows:

| | | |
|---|---|---|
| 16% | e(M) | The scheduling error metric |
| 9% | e(M(D,S]) | First calibration error metric. Contribution to error due to calibration errors in user-set parameters: core parameters and modeling factor |
| 12% | e(M[D]) | Second error metric. Contribution to error due to calibration errors in shrinkage, core parameters, and modeling factor. |
| 13% | e(M[S]) | SC error metric. Contribution to error due to calibration errors in predicted demand and in user-set parameters |
| 3% | e(M[D]- e(M(D,S]) | The contribution to errors due to calibration errors in shrinkage |
| 4% | e(M[S]- e(M(D,S]) | The contribution to errors due to calibration errors in demand forecasts |

In some embodiments, the method 300 comprises the CDI receiving, at block 310, historical calibrations from previous weeks or periods, and the CDI displaying through the I/O device the historical calibrations. The historical calibrations may provide an indication of how much error from each group of parameters and even from each parameter could be reduced by the calibrations. For example, the display may be the following message:

In previous weeks you have been able to reduce errors due to the following parameters to the following levels:
User-set parameters: 1%
Shrinkage: 2%
Demand forecasts: 2%
It looks like calibrating the user-defined parameters and modeling factor may improve the accuracy of the predictions by 9−1=8% (calculated from e(M(D,S]), the historical error improvement of due to calibrating the user-defined parameters and modeling factor), but calibrating shrinkage is only likely to yield an improvement of 3−2=1% (calculated from e(M[D]−e(M(D,S]), the historical error improvement due to calibrating shrinkage).

The display of historical calibrations may help the user to adjust modeling data (as further described herein). If the user is manually adjusting modeling data to reduce the predicted error, then if the user is able to reduce the contribution to error from uncalibrated user-defined parameters and modeling factor from 9% to 5% during their adjustments, it is likely that if continue searching is continued through other adjustments, the error will be further reduced. However, if the user made adjustments and reduced shrinkage from 3% to 2%, trying other adjustments to shrinkage likely won't improve much.

In some embodiments, the method 300 comprises the CDI displaying on an I/O device, at block 312, a prompt, "Do you want to calibrate the user-set parameters (core parameters and modeling factor)?"

In some embodiments, the method 300 comprises the CDI receiving, at block 314 an input from the user to calibrate the user-set parameters. In response, the CDI sets M[D,S] as the calibration model of the modeler, since this is the model used to calibrate the core parameters and modeling factors. If the user decides not to calibrate the core parameters and modeling factors, the method proceeds at block 332.

In some embodiments, to ensure that the modelling factor is calibrated before calibrating shrinkage, the user is guided to calibrate user-set parameters first. This order of calibration may ensure that unknown factors represented by the modelling factor get taken into account by the calibration first. Thus, when calibrating shrinkage (as further described herein), the second calibration error metric e(M[D]) will only represent the contribution of shrinkage that is occurring in the contact center to (M[D]), and shrinkage is not adjusted to compensate for other factors. Earlier calibration approaches were not able to isolate the shrinkage and the modeling factor, since there was no calibration model M[D, S] controlling both demand and shrinkage. In some embodiments, this enables a user to calibrate user-set parameters, particularly the modeling factor, independently from shrinkage.

In some embodiments, the method 300 comprises the CDI receiving, at block 316, an input from the user selecting a user-defined parameter to calibrate. For example, the user selects patience. Patience shall hereinafter be used as an example of calibrating a user-defined parameter.

In some embodiments, the method 300 comprises the CDI displaying, at block 318, the current settings for patience and prompts the user to make adjustments to the patience value.

In some embodiments, the method 300 comprises the CDI receiving, at block 320, adjusted values for patience from the user.

In some embodiments, the method 300 comprises the CDI transmitting, at block 322, updated modeling data that include the adjusted patience values, to the modeler, and the modeler computing an adjusted error metric e(M[D,S]) accordingly.

In some embodiments, the method 300 comprises the CDI receiving, at block 324, the adjusted error metric e(M[D,S]) and the CDI displaying on the I/O device, for example, the updated error metric e(M[D,S]) of 7%, and may also display the previous error metric e(M[D,S]) of 9%.

The user may observe, from the historical calibrations displayed on the CCI, that previous calibrations of the user-set parameters were able to reduce the error metric e(M[D,S]) to 1%. This may indicate to the user that further reducing e(M[D,S]) from 7% is still possible, and it may therefore be worthwhile to continue adjusting the patience.

In some embodiments, the method 300 comprises the CDI prompting the user, at block 326, if calibrating patience should continue. If the CDI receives a positive input for the I/O device, and then the previous three steps (318, 320, and 322) are repeated iteratively until the CDI receives a negative input from the I/O device to the prompt to continue calibrating patience (i.e., the user is satisfied with the adjusted patience).

In some embodiments, the method 300 comprises the CDI prompting the user, at block 328, if calibrate another user-set parameter should be started. If the CDI receives a positive input, then the previous five steps (316, 318, 320, 322, and 324) are repeated for other user-set parameters until the CDI receives a negative input to the prompt to continue calibrating another user-set parameter (i.e., the user is satisfied with the first calibration error metric given by the adjusted user-set parameters).

In some embodiments, the core parameters are calibrated before the modeling factor. Since the core parameters are based on the knowledge and intuition of contact center employees, the user will provide more accurate adjustments to the core parameters than to the modeling factor. After the core parameters are calibrated, modeling factor is the only uncalibrated user-set parameter. Moreover, since the modeler 215 is operating in the demand-shrinkage controlled mode, i.e., using actual demands and actual schedule to the statistics predictor 225, the uncalibrated modeling factor is the residual contributing source of error to the first calibration error metric In some embodiments, the CDI gives the user an option of returning to a user-set parameter that was earlier adjusted, in an effort to further reduce the first calibration error metric e(M[D,S]).

In some embodiments, the method 300 comprises the CDI instructing, at block 330, the modeler to compute the first through third calibration error metrics. For example, the CDI may display as follows:

Total model prediction error=8% (An example of the total model error calculated in block 302)

Estimates of how model data contribute to this error:
Core parameters and Modeling Factors: 1%
Shrinkage: 4%
Demand forecasts: 3%

In some embodiments, the CDI displays on the I/O device, at block 332, a prompt, "Do you want to calibrate shrinkage?"

In some embodiments, the CDI receives, at block 334, a user input to calibrate the shrinkage. The calibration controller sets M[D] as the calibration model. With the user-set parameters calibrated, the extent to which the user-set parameters contribute to the error is known to be1 %. Remaining error in e(M[D]−e(M[D,S will calculate the residual impact of shrinkage.

In some embodiments, the method 300 comprises the CDI displaying on an I/O device, at block 334, the current setting for shrinkage and prompts the user to make adjustments to shrinkage values.

In some embodiments, the method 300 comprises the CDI receiving, at block 336, an adjusted values for shrinkage from the user.

In some embodiments, the method 300 comprises the CDI transmitting, at block 338, updated modeling data that include the adjusted shrinkage, to the modeler, and instructing the modeler to compute an adjusted error metric e(M[D]).

In some embodiments, the method 300 comprises the CDI receiving, at block 340, the updated error metric e(M[D]). The CDI calculates an adjusted error metric difference e(M[D])−e(M[D,S]) accordingly. (Note that e(M[D,S]) does not change from when the user-set parameters were calibrated.) The CDI displays an updated error due to shrinkage e(M[D])−e(M(D,S]); —for example, 4%, and may also display the previous error due to shrinkage.

In some embodiments, the method 300 comprises the CDI prompting the user, at block 342, if calibrating shrinkage should continue. If the CDI receives a positive input, then the previous four steps (334, 336, 338, and 340) are repeated iteratively until the CDI receives a negative input to the prompt to continue calibrating shrinkage (i.e., the user is satisfied with the adjusted shrinkage). If not, the method proceeds to block 334.

In some embodiments, the method 300 comprises the CDI instructing, at block 344, the modeler to compute the second and third calibration error metrics. For example, the CDI may display the total error and breakdown percentages by category.

In some embodiments, the method 300 comprises the CDI, at block 346, prompting the user to save the calibrated modeling data, receiving an input from the user to the positive, and saving the calibrated modeling data in the WFM database.

In some embodiments, CDI 260 may display on the I/O device inputs and outputs of previous calibrations. The previous calibration may provide reasonable benchmark target for each group of parameters. The display of previous calibrations may be useful information for the user, to help decide which user-defined parameters to focus on adjusting, particularly if a schedule is needed quickly and time for trial-and-error is limited.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for calibrating scheduling model parameters of a work force management (WFM) scheduling model, comprising:
obtaining, by a modeler in a schedule analyzer of a WFM system, modeling data for a previous period comprising:
forecasted demands;
a published schedule;
predicted service levels;
actual demands;
an actual schedule;
actual service levels; and
scheduling model parameters comprising a shrinkage and user-set calibration parameters, wherein the user-set calibration parameters comprise core parameters and a modeling factor;
executing the following calibration:
instructing, by a calibration director and interface (CDI) of the WFM system, a statistics predictor and the modeler in a demand-shrinkage controlled mode, to compute, a first calibration-error metric $e(M[D,S])$ as a function of the actual demands, the actual schedule, the shrinkage set to zero, the core parameters, and the actual service levels, wherein the statistics predictor, and the modeler are comprised in the schedule analyzer;
receiving, by the CDI, the first calibration-error metric $e(M[D,S])$; and
displaying, by the CDI, the first calibration-error metric on an input/output device (I/O device) of the WFM system;
repeating the following process separately for each of the user-set calibration parameters, until the CDI receives an input from the I/O device to stop adjusting for the user-set calibration parameters, wherein the input to stop is based on achieving target user-set calibration parameters, and wherein the modeling factor is calibrated independently from the shrinkage:
receiving, by the CDI from the I/O device, an adjustment to a value for each of the user-set calibration parameters;
transmitting, by the CDI to the modeler, the adjustment to the value for each of the user-set calibration parameters;
instructing, by the CDI, the modeler to compute a new first calibration-error metric $e(M[D,S])$, substituting an adjustment value for those used in the computation of the first calibration-error metric;
receiving, by the CDI from the modeler, the new first calibration-error metric; and
displaying, by the CDI to the I/O device, the new first calibration-error metric;
instructing, by the CDI, the statistics predictor, and the modeler in a demand controlled mode, to compute, a second calibration-error metric as a function of the actual demand, the published schedule, the shrinkage, calibrated core parameters, the calibrated modeling factor and the actual service levels;
receiving, by the CDI, the second calibration-error metric $e(M[D])$;
displaying, by the CDI, a calibration-error metric difference $e(M[D,S])-e(M[D])$ on the I/O device;
receiving, by the CDI from the I/O device, an adjustment to the shrinkage;
transmitting, by the CDI, to the modeler the adjustment to the shrinkage and the calibrated core parameters and the calibrated modeling factor;
repeating the following, until the CDI receives an input from the I/O device to stop adjusting, wherein the input to stop is based on achieving a target calibration shrinkage, wherein the shrinkage is calibrated independently from the modeling factor:
receiving, by the CDI from the I/O device, an adjustment to the shrinkage;
transmitting, by the CDI to the modeler, the adjustment to the shrinkage;
instructing, by the CDI the modeler to compute a new second calibration-error metric $e(M[D])$, substituting the adjustment to the shrinkage for those used in the computation of the second calibration-error metric;
receiving, by the CDI from the modeler, the new second calibration-error metric;
displaying, by the CDI to the I/O device, the new second calibration-error metric;
updating a WFM database of the WFM system with the calibrated core parameters, the calibrated modeling factor, and the calibrated shrinkage, replacing core parameters, a modeling factor, and shrinkage from the previous period;
determining a difference between the first calibration-error metric and the second calibration-error metric to determine a scheduling error metric attributable to shrinkage; and
responsive to determining that (a) the new second calibration-error metric, and (b) the determined scheduling error metric attributable to shrinkage are each within a predetermined threshold, automatically updating the WFM scheduling model based on the calibrated core parameters, the calibrated modeling factor, and the calibrated shrinkage.

2. The method of claim 1, wherein the user-set calibration parameters are calibrated such that the core parameters are calibrated before the modeling factor.

3. The method of claim 1, further comprising:
receiving, by the CDI, predicted service levels and the actual service levels;
calculating, by the CDI, a scheduling error metric $e(M)$; and displaying, by the CDI on the I/O device, a calibration health indicator configured to indicate a difference between the scheduling error metric and a predetermined scheduling model error tolerance.

4. The method of claim 1 wherein, the I/O device instructs the WFM system to start calibration of scheduling model parameters.

5. The method of claim 1, wherein the CDI stores in the WFM database, the modeling data calibrated by the method as historical calibrated modeling data, and the first and second calibration-error metrics.

6. The method of claim 1, further comprising
instructing, by the CDI, a schedule optimizer, the statistics predictor and the modeler, in a shrinkage controlled mode, to compute, a third calibration-error metric e(M[S]) as a function of the forecasted demand, the actual schedule, a shrinkage set to zero, the calibrated core parameters, the calibrated modeling factor, and the actual service levels;
performing, by the CDI, one of the following: saving the third calibration-error metric in the WFM database, alerting an I/O device of a user of the WFM system, or any combination thereof.

7. A system for calibrating modeling data of a work force management (WFM) system, comprising:
a memory comprising instructions that when executed on a processor cause the system to perform a method comprising:
receive, by a modeler in a schedule analyzer of the WFM system, modeling data for a previous period comprising: forecasted demands; a published schedule; predicted service levels; actual demands; an actual schedule; actual service levels; and scheduling model parameters comprising a shrinkage and user-set calibration parameters, wherein the user-set calibration parameters comprise core parameters and a modeling factor;
execute the following calibration:
instruct, by a calibration director and interface (CDI) of the WFM system, a statistics predictor and the modeler in a demand-shrinkage controlled mode, to compute, a first calibration-error metric e(M[D,S]) as a function of the actual demands, the actual schedule, the shrinkage set to zero, the core parameters, and the actual service levels, wherein the statistics predictor, and the modeler are comprised in the schedule analyzer;
receive, by the CDI, the first calibration-error metric e(M[D,S]);
display, by the CDI, the first calibration-error metric on an input/output device (I/O device) of the WFM system;
repeat the following process separately for each of the user-set calibration parameters, until the CDI receives an input from the I/O device to stop adjusting for the user-set calibration parameters, wherein the input to stop is based on achieving target calibration of the user-set calibration parameters, and wherein the modeling factor is calibrated independently from the shrinkage;
(i) receive, by the CDI from the I/O device, an adjustment to a value for each of the user-set calibration parameters;
(ii) transmit, by the CDI to the modeler, the adjustment to the value for each of the user-set calibration parameters;

(iii) instruct, by the CDI, the modeler to compute a new first calibration-error metric e(M[D,S]), substituting an adjustment value for those used in the computation of the first calibration-error metric;
(iv) receive, by the CDI from the modeler, the new first calibration-error metric; and
(v) display, by the CDI to the I/O device, the new first calibration-error metric;
instruct, by the CDI, the statistics predictor, and the modeler in a demand controlled mode, to compute, a second calibration-error metric as a function of the actual demand, the published schedule, the shrinkage, the calibrated core parameters, the calibrated modeling factor and the actual service levels;
receive, by the CDI, the second calibration-error metric e(M[D]);
display, by the CDI, a calibration-error metric difference e(M[D,S])−e(M[D]) on the I/O device;
receive, by the CDI from the I/O device, an adjustment to the shrinkage;
transmit, by the CDI, to the modeler the adjustment to the shrinkage and the calibrated core parameters and the calibrated modeling factor;
repeat the following, until the CDI receives an input from the I/O device to stop adjusting, wherein the input to stop is based on achieving a target calibration shrinkage, wherein the shrinkage is calibrated independently from the modeling factor:
(i) receive, by the CDI from the I/O device, an adjustment to the shrinkage;
(ii) transmit, by the CDI to the modeler, the adjustment to the shrinkage;
(iii) instruct, by the CDI the modeler to compute a new second calibration-error metric e(M[D]), substituting the adjustment to the shrinkage for those used in the computation of the second calibration-error metric;
(iv) receive, by the CDI from the modeler, the new second calibration-error metric;
(v) display, by the CDI to the I/O device, the new second calibration-error metric;
update a WFM database of the WFM system with the calibrated core parameters, the calibrated modeling factor, and the calibrated shrinkage, replacing core parameters, a modeling factor, and shrinkage from the previous period;
determine a difference between the first calibration-error metric and the second calibration-error metric to determine a scheduling error metric attributable to shrinkage; and
responsive to determining that (a) the new second calibration-error metric, and (b) the determined scheduling error metric attributable to shrinkage are each within a predetermined threshold, automatically update the WFM scheduling model based on the calibrated core parameters, the calibrated modeling factor, and the calibrated shrinkage.

8. The system of claim 7, wherein the user-set calibration parameters are calibrated such that the core parameters are calibrated before the modeling factor.

9. The system of claim 7, further comprising receive, by the CDI, predicted service levels and the actual service levels;
calculate, by the CDI, a scheduling error metric e(M); and
display, by the CDI on the I/O device, a calibration health indicator configured to indicate
a difference between the scheduling error metric and a predetermined scheduling model error tolerance.

10. The system of claim 7, wherein the CDI stores in the WFM database, the modeling data calibrated by the method as historical calibrated modeling data, and the first and second calibration-error metrics.

11. The system of claim 7, further comprising instruct, by the CDI, a schedule optimizer, the statistics predictor and the modeler, in a shrinkage controlled mode, to compute, a third calibration-error metric e(M[S]) as a function of the forecasted demand, the actual schedule, a shrinkage set to zero, the calibrated core parameters, the calibrated modeling factor, and the actual service levels;

perform, by the CDI, one of the following: saving the third calibration-error metric in the WFM database, alerting an I/O device of a user of the WFM system, or any combination thereof.

12. The system of claim 7, further comprising a calibration health indicator configured to display a scheduling model health level based on a calculated scheduling error metric, wherein the calculated scheduling error metric is determined in accordance with predicted service levels and the actual service levels.

* * * * *